(12) United States Patent
Sinharoy (10) Patent No.: US 6,457,120 B1
(45) Date of Patent: Sep. 24, 2002

(54) PROCESSOR AND METHOD INCLUDING A CACHE HAVING CONFIRMATION BITS FOR IMPROVING ADDRESS PREDICTABLE BRANCH INSTRUCTION TARGET PREDICTIONS

(75) Inventor: Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/431,369

(22) Filed: Nov. 1, 1999

(51) Int. Cl.[7] .................... G06F 13/14; G06F 12/08; G06F 9/38; G06F 9/42; G06F 9/32
(52) U.S. Cl. ................ 712/239; 712/236; 712/237; 712/245; 712/240; 711/123; 711/125; 711/144; 711/145
(58) Field of Search ................. 712/218, 217, 712/219, 222, 228, 225, 230, 214, 233, 216, 234, 215, 236, 237, 240, 245, 241, 40, 41, 42, 43, 23, 239; 711/123, 125, 137, 144, 145

(56) References Cited

U.S. PATENT DOCUMENTS

| 5,226,130 A | 7/1993 | Favor et al. |
|---|---|---|
| 5,553,253 A | 9/1996 | Pan et al. |
| 5,625,788 A | * 4/1997 | Boggs et al. ............... 712/214 |
| 5,835,745 A | 11/1998 | Sager et al. |
| 5,881,277 A | * 3/1999 | Bondi et al. ................ 712/239 |
| 6,101,577 A | 8/2000 | Tran |

* cited by examiner

Primary Examiner—Daniel H. Pan
(74) Attorney, Agent, or Firm—Mark E. McBurney; Bracewell & Patterson, L.L.P.

(57) ABSTRACT

A superscalar processor and method are disclosed for improving the accuracy of predictions of a destination of a branch instruction utilizing a cache. The cache is established including multiple entries. Each of multiple branch instructions are associated with one of the entries of the cache. One of the entries of the cache includes a stored predicted destination for the branch instruction associated with this entry of the cache. The predicted destination is a destination the branch instruction is of predicted to branch to upon execution of the branch instruction. The stored predicted destination is updated in the one of the entries of the cache only in response to two consecutive mispredictions of the destination of the branch instruction, wherein the two consecutive mispredictions were made utilizing the one of the entries of the cache.

54 Claims, 4 Drawing Sheets

PROCESSOR AND METHOD INCLUDING A CACHE HAVING CONFIRMATION BITS FOR IMPROVING ADDRESS PREDICTABLE BRANCH INSTRUCTION TARGET PREDICTIONS

BACKGROUND OF THE INVENTION

1. Field of the Invention

The present invention relates in general to a data processing system and, in particular, to a superscalar processor. Still more particularly, the present invention relates to a superscalar processor and method for improving the accuracy of predictions of branch instruction destinations utilizing a cache including confirmation bits.

2. Description of the Related Art

Most architectures include branch instructions whose targets cannot be calculated from the address of the branch and the instruction itself. A branch (conditional or unconditional) whose target address is stored in a separate register and cannot be: calculated from the address of the instruction and the instruction itself is referred to here as an address-predictable branch instruction. For example, in the PowerPC (TM) architecture, the target address for "Branch Conditional to Link Register" (BCLR) or "Branch Conditional to Link Register and Link" (BCLRL) instructions is found in the Link Register (LR), and the target address for "Branch Conditional to Count Register" (BCCTR) or "Branch Conditional to Count Register and Link" (BCCTRL) instructions is found in the Count Register (CTR). The Link Register and Count Register are special purpose registers in the PowerPC architecture which are used mainly for storing the address of these instructions.

The architecture guarantees that these special-purpose registers will contain the requisite target address for an address-predictable branch when the instruction immediately prior to the address-predictable branch completes. An S instruction completes when a completion signal is received from the completion unit. In a deeply-pipelined microprocessor, an instruction is usually fetched many cycles prior to its execution and subsequent completion. Since the completion of this prior instruction usually lags the fetching of the instructions following the address-predictable branch by many cycles, there is a need to be able to predict the target of such branches with high accuracy.

A cache, which is a small amount of memory, may be maintained within a processor to store the predicted target addresses for such address-predictable branches.

A programmer writes code in a particular sequence. The code may include various branch, or jump, instructions. Branch instructions cause a departure during the execution of instructions from the original sequential order of the instructions. One method for increasing the speed of execution of instructions is to predict the likely outcome of the execution of a branch instruction. A prediction is made as to whether or not a branch will be taken the next time this branch instruction is executed.

A cache may be maintained within a processor which is a small amount of memory which includes a predicted destination for a particular type of branch instruction. This particular type of branch instruction is an address-predictable branch instruction whose target address is stored in a separate register, such as the cache described above, and whose target address cannot be calculated from the instruction itself.

The cache includes a plurality of entries. Each branch instruction will be associated with one of the entries. When a branch instruction is fetched, the entry of the cache associated with this branch instruction is read to determine the predicted destination for this branch.

Typically, after the branch is executed, if the actual branch destination was different from the predicted branch destination, the appropriate entry of the cache will be updated to include the actual destination. However, a problem can arise when the branch instruction continues to branch consecutively between a more common destination and a less common destination. For example, if a branch instruction first branches to a destination "A", then to destination "B", and then back to destination "A", and continuing with this pattern, it is clear that the cache will always contain an incorrect prediction. After the branch to "B", the entry of the cache will be updated to include "B" as the predicted destination. Thereafter, after the next branch to "A", the cache will again be updated to predict "A" as the destination. For the example given, the cache will always mispredict the destination of this branch instruction.

Therefore a need exists for a data processing system and method for improving the accuracy of predictions of destinations of a particular type of address-predictable branch instructions utilizing a cache.

SUMMARY OF THE INVENTION

A superscalar processor and method are disclosed for improving the accuracy of predictions of a destination of a branch instruction utilizing a cache. The cache is established including multiple entries. Each of multiple branch instructions are associated with one of the entries of the cache. One of the entries of the cache includes a stored predicted destination for the branch instruction associated with this entry of the cache. The predicted destination is a destination the branch instruction is predicted to branch to upon execution of the branch instruction. The stored predicted destination is updated in the one of the entries of the cache only in response to two consecutive mispredictions of the destination of the branch instruction, wherein the two consecutive mispredictions were made utilizing the one of the entries of the cache.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

The present invention relates generally to a superscalar processor and more particularly to a system and method for improving the overall throughput in such a processor. The following description is presented to enable one of ordinary skill in the art to make and use the invention and is provided in the context of a patent application and its requirements. Various modifications to the preferred embodiment will be readily apparent to those skilled in the art. The generic principles herein may be applied to other embodiments. Thus, the present invention is not intended to be limited to the embodiment shown but is to be accorded the widest scope consistent with the principles and features described herein.

The present invention is a system and method in a superscalar processor for improving the accuracy of predictions of the destination of a particular type of address-predictable branch instruction utilizing a cache. The instructions are address-predictable branch instructions whose target address is stored in a separate register. The target address for this type of address-predictable branch instruction cannot be calculated from the instruction itself.

The cache includes a plurality of entries. Each address-predictable branch instruction is associated with one of the entries. The entry associated with an address-predictable branch instruction stores a predicted destination to which the address-predictable branch instruction will branch when it is next executed.

In accordance with an important feature of the present invention, each cache entry also includes an associated confirmation bit. The confirmation bit is utilized to track consecutive mispredictions for a particular address-predictable branch instruction. Preferably, the confirmation bit is a single bit. However, those skilled in the art will recognize the multiple bits may be utilized. For example, the confirmation bit may be implemented utilizing two or three bits.

When an address-predictable branch instruction is fetched, the entry of the cache associated with the address-predictable branch instruction will be read to determine the predicted destination of the branch. In addition, the confirmation bit associated with this entry will also be read. The address-predictable branch instruction will then be executed, and an actual destination will be determined.

If the actual destination to which the address-predictable branch instruction branched is the same as the predicted destination read from the cache entry, the confirmation bit will be set equal to a one.

When the confirmation bit is set equal to a one, the confirmation bit indicates either that the last prediction was correct or that the cache entry has been updated to include an accurate prediction for the last execution of the address-predictable branch instruction.

If the actual destination to which the address predictable branch instruction branched is different from the predicted destination read from the cache entry, the setting of the confirmation bit will be determined. If the confirmation bit is set equal to a one at the time of making a prediction, indicating that the last prediction was correct, the confirmation bit will be reset to be equal to a zero. In this manner, for the next execution of this address-predictable branch instruction, the confirmation bit will indicate that this prediction was incorrect.

If the confirmation bit is already set equal to a zero at the time of making a prediction, indicating that the last prediction was also incorrect, the cache entry will be updated by storing the actual destination into the entry. The confirmation bit will also be set to be equal to a one. In this manner, for the next execution of this address-predictable branch instruction, the confirmation bit will indicate that the prediction stored in the cache entry was the actual destination for the branch when it was last executed.

As an example, consider a particular address-predictable branch instruction which follows the following branching pattern during consecutive executions, branching first to location "A", then to "B", "A", "C", and then back to "A". It is clear that the address-predictable branch instruction will most often branch to location "A". Thus, the entry of the cache will be most often correct if the entry includes the destination of "A".

When the branch is first executed, assuming the entry of the cache does not have a value of "A", the confirmation bit will be read. Assuming the current value of the confirmation bit is set equal to a zero, indicating that the last time this branch was executed the cache included an incorrect prediction, the confirmation bit is set equal to a one, and the entry is updated to store a destination of "A".

Following the example, for the next execution to an actual destination of "B", the cache includes an incorrect prediction of "A" and a confirmation bit equal to a one.

Therefore, upon this execution, the prediction stored in the cache is not updated. However, the confirmation bit is reset equal to a zero. For the next execution to an actual destination of "A", the cache includes a correct prediction of "A" and a confirmation bit equal to a zero. Therefore, upon this execution, the prediction stored in the cache is not updated. However, the confirmation bit is set equal to a one. For the next execution to an actual destination of "C", the cache includes an incorrect prediction of "A" and a confirmation bit equal to a one. Therefore, upon this execution, the prediction stored in the cache is not updated, but the confirmation bit is reset equal to a zero. As is readily apparent from this example, the cache value remains the same unless and until two consecutive mispredictions occur which were determined utilizing the same cache entry.

A first prediction determined utilizing one cache entry is not consecutive to a second prediction determined utilizing a different cache entry. For two predictions to be consecutive, the predictions must be determined utilizing the same cache entry.

As another example, multiple address-predictable branch instructions may be aliased to the same cache entry. Aliasing occurs when more than one instruction maps to the same cache entry. When an entry is aliased, it will include a prediction for only one of the instructions mapped to that cache entry. For example, suppose a set of instructions A, B, C, and D are all aliased to the same cache entry. In this example, the first instruction A branches to location a, the second instruction B branches to location b, the third instruction C branches to location c, and the fourth instruction D branches to location d. If these four instructions are mapped to a single cache entry, the entry will include a prediction for just one of these instructions.

Also suppose the following is the order of execution of the instructions: A, then A, then B, A, C, A, A, D, and then A. Assuming the starting value of the associated confirmation bit is zero, the prediction stored in this cache entry will be changed only when two consecutive mispredictions occur when utilizing this entry. Utilizing the present invention, the cache will accurately predict the correct target destination five times. Without the present invention, the cache would accurately predict the correct target destination only two times.

A superscalar processor includes a number of stages, such as the following, in the processor pipeline. Each stage includes one or more pipelines. In a typical first stage, referred to as an instruction fetch stage, an instruction is fetched from a memory hierarchy. Then, in a decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched according to the control bits to a unit having an execution stage, or possibly to an intervening reservation station, which ultimately issues the instruction to an associated execution stage, also called an execution unit.

The execution stage processes the operation as specified by the instruction. Executing an operation specified by an instruction includes accepting one or more operands and producing one or more results in the order of available operands.

A completion stage deals with program order issues that arise from concurrent execution, wherein multiple, concurrently executed instructions may deposit results in a single register. It also handles recovery issues arising from instructions subsequent to an interrupted instruction depositing results in their destination registers.

Figure 1:
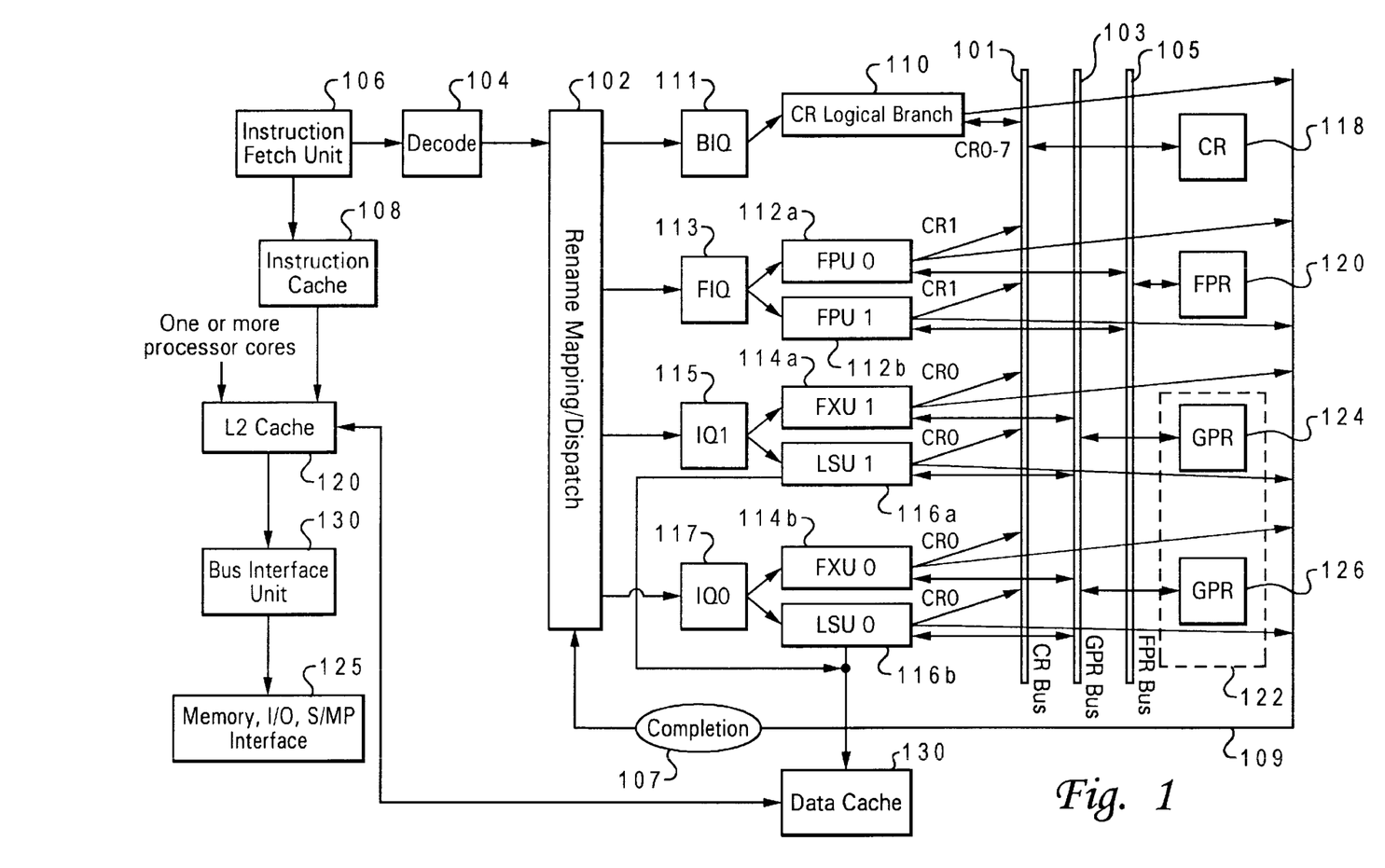
FIG. 1 illustrates a block diagram of a superscalar processor in accordance with the present invention.

FIG. 1 is a block diagram of a superscalar processor 100 in accordance with the present invention. The processor includes an instruction fetch unit (IFU) 106 which provides signals to a decode unit 104 which utilizes a rename mapping structure 102. The rename mapping structure 102 provides information directly to issue queue 111–117. The issue queues 111, 113, 115, and 117 in turn feed the execution units 110, 112a–b, 114a–b, and 116a–b.

Instruction cache 108 stores instructions received from IFU 106. Data cache 130 receives data from execution units 110–116. A level two (L2) cache 120 is utilized to store 2-G data and instructions from data cache 130 and instruction cache 108. Processor 100 includes a bus interface unit (BIU) 130 which passes information between L2 cache 120 and the peripheral device interface 125.

In this embodiment, branch issue queue 111 provides information to the condition register (CR) logical or branch unit 110. Floating point issue queue (FIQ) 113 provides information to the two floating point units (FPUs) 112a and 112b. Issue queue (IQ) 115 provides information to fixed point unit (FXU) 114a and load/store unit (LSU) 116. IQ 117 provides information to FXU 114b and LSU 116b. Although the issue queues are arranged in the above-identified manner, one of ordinary skill in the art readily recognizes that the issue queues can be arranged in a different manner and that arrangement would be within the spirit and scope of the present invention.

Conditional register 118 provides and receives information from a CR bus 101. Floating point architectural registers (FPRs) 120 provide and receive information from a FPR bus 105. General purpose registers (GPRs) 124 and 126 provide and receive information from a GPR bus 103. Completion unit 107 provides information to rename mapping 102 via a completion bus 109.

Branch unit 110 provides and receives information via the CR bus 101 utilizing conditional registers 0–7. (CR0–7). FPU 112a and FPU 112b provides information to CR 118 via CR bus 101 utilizing conditional register 1. FPU 112a and 112b also receive and provide information from and to FPR pool 120 via FPR bus 105. FXU 114a, FXU 114b, LSU 116a, and LSU 116b output results to CR 118 via CR bus 101 utilizing conditional register 0. FXU 141a, FXU 146, LSU 116a, and LSU 116b also receive and provide information from and to GPR pool 122 via GPR bus 103. GPR pool 122 is implemented utilizing a shadow GPR arrangement in which there are two GPRs 124 and 126. All of the execution units 110–116 provide results to the completion unit 107 via completion bus 109.

Figure 2:
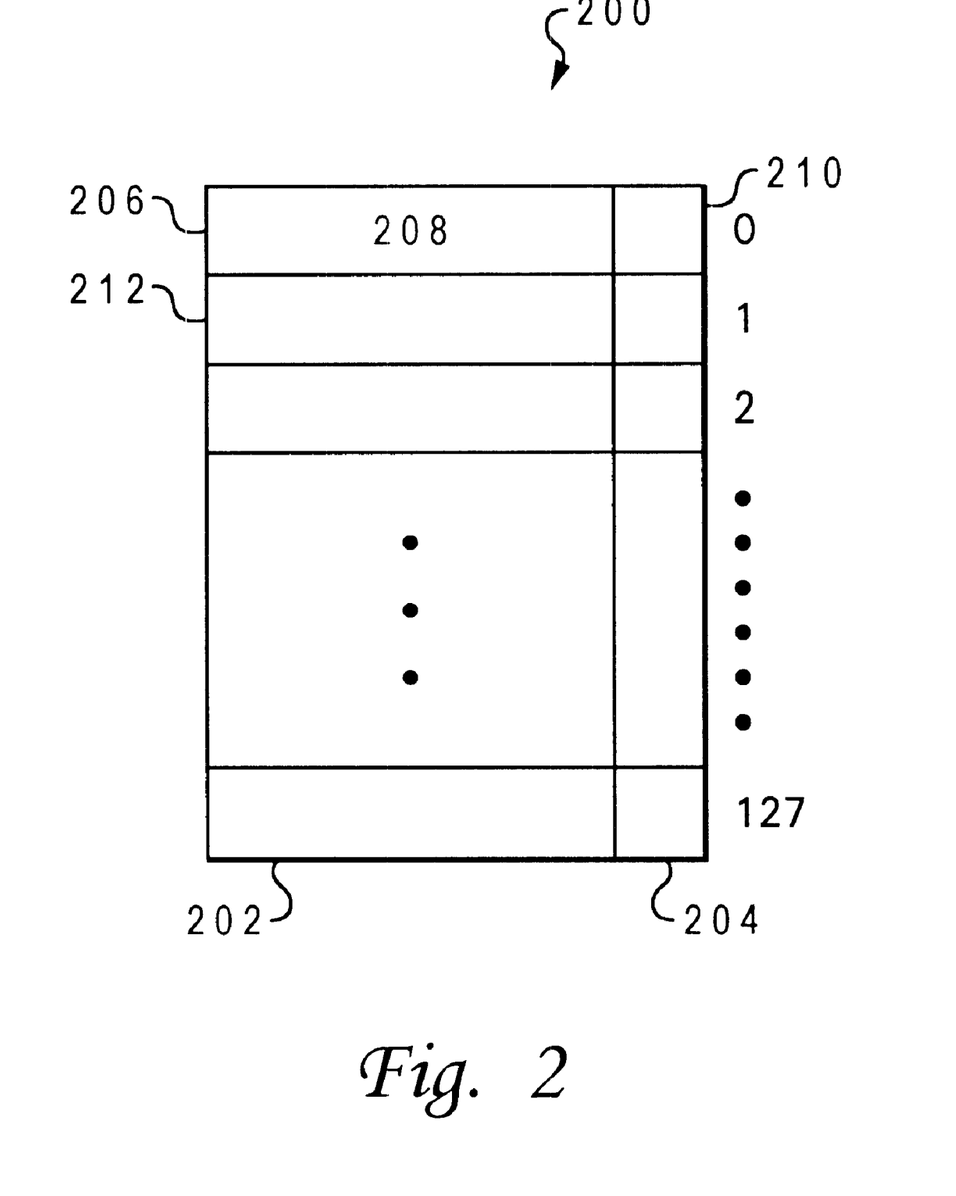
FIG. 2 depicts a pictorial representation of a cache including a confirmation bit associated with each entry of the cache in accordance with the method and system of the present invention.

FIG. 2 depicts a pictorial representation of a cache including a confirmation bit associated with each entry of the cache in accordance with the method and system of the present invention. A cache 200 is depicted which includes a plurality of entries 202. A plurality of confirmation bits 204 are also included within cache 200. Each entry has an associated confirmation bit. Each cache entry includes a prediction of a destination for the address-predictable branch instruction associated with the entry. For example, for the address-predictable branch instruction associated with entry 206, the prediction is stored in field 208, and the value of the confirmation bit is stored in field 210.

Figure 3:
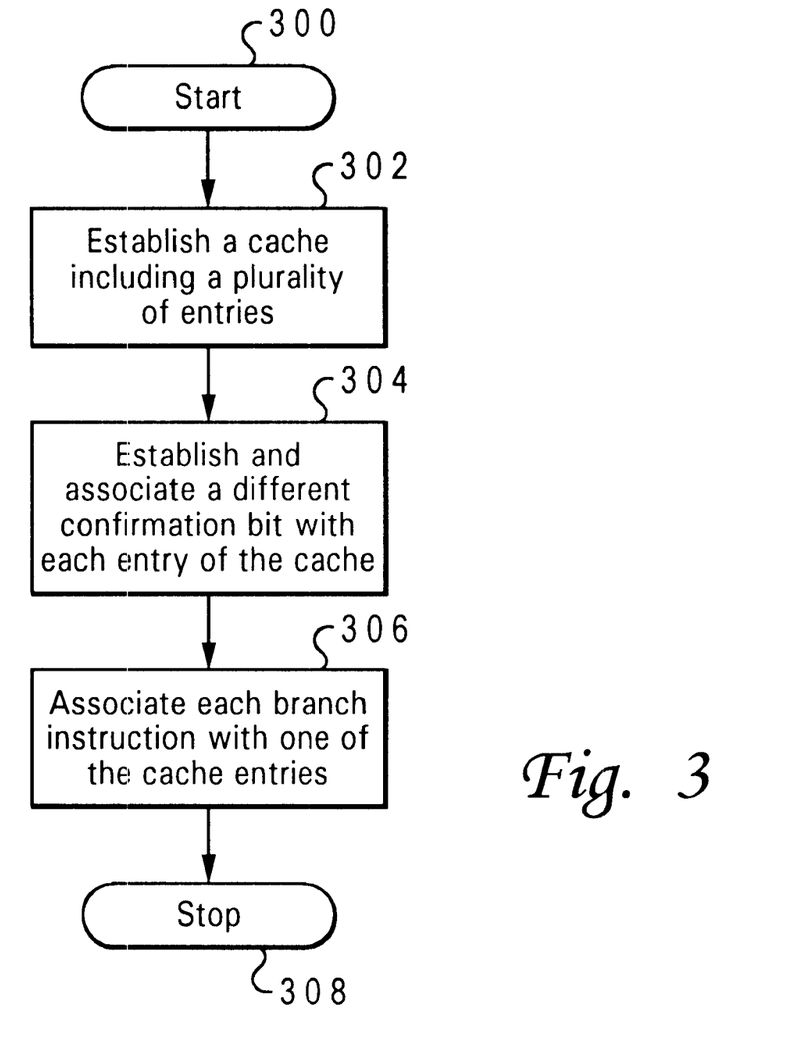
FIG. 3 illustrates a high level flow chart which depicts establishing a cache having a plurality of entries, each entry having an associated confirmation bit in accordance with the method and system of the present invention.

FIG. 3 illustrates a high level flow chart which depicts establishing a cache having a plurality of entries, each entry having an associated confirmation bit in accordance with the method and system of the present invention. The process starts as depicted at block 300 and thereafter passes to block 302 which illustrates establishing a cache which includes a plurality of entries. Next, block 304 depicts establishing and associating a different confirmation bit with each entry of the cache. The process then passes to block 306 which illustrates associating each address-predictable branch instruction with one of the entries of the cache. The process then terminates as depicted at block 308.

In the preferred embodiment, a hashing scheme is utilized to associate an address-predictable branch instruction with a particular entry of the cache. An address-predictable branch instruction is associated with an entry of the cache utilizing the address of the address-predictable branch instruction. A portion of the address of the address-predictable branch instruction is used to determine which entry of the cache to utilize for the instruction. For example, for a 64-bit RISC architecture, bits 52–58 may be utilized to select an entry in the cache. Those skilled in the art will recognize that other association schemes may be utilized.

Figure 4:
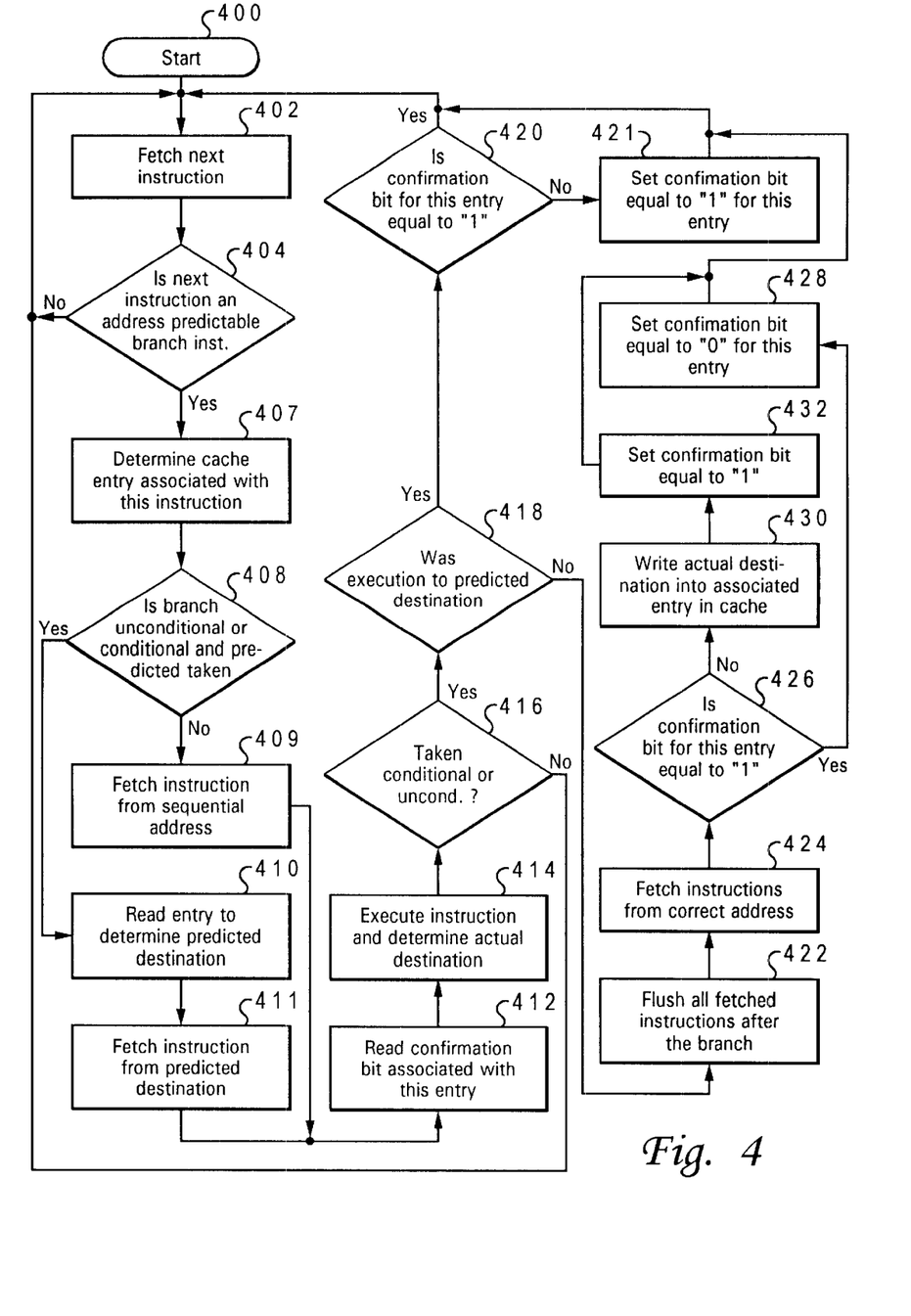
FIG. 4 illustrates a high level flow chart which depicts utilizing a confirmation bit associated with an entry in a cache to improve the prediction of a destination of a branch instruction in accordance with the method and system of the present invention.

FIG. 4 illustrates a high level flow chart which depicts utilizing a confirmation bit associated with an entry in a cache to improve the prediction of a destination of an address-predictable branch instruction in accordance with the method and system of the present invention. The process starts as depicted at block 400 and thereafter passes to block 402 which depicts fetching the next instruction. Next, block 404 illustrates a determination of whether or not the next instruction is an address-predictable branch instruction. The instruction may be either an unconditional address-predictable branch instruction or a conditional address-predictable branch instruction. If a determination is made that the next instruction is not an address-predictable branch instruction, the process passes back to block 402.

Referring again to block 404, if a determination is made that the next instruction is an address-predictable branch instruction, the process passes to block 407 which depicts determining which cache entry is associated with this particular address-predictable branch instruction. A portion of the address of the address-predictable branch instruction is used to determine which entry of the cache should be used for predicting the target address. For example, for a 64-bit RISC architecture, bits 52 through 58 of the address of the address-predictable branch instruction can be used to index into the 128-entry cache of the preferred embodiment. Those skilled in the art will recognize that other association schemes may be utilized to achieve the same result.

Thereafter, block 408 illustrates a determination of whether or not this address-predictable branch instruction is an unconditional branch or a conditional branch predicted to be taken. If a determination is made that this address-predictable branch instruction is either an unconditional branch or a conditional branch predicted to be taken, the process passes to block 410. Referring again to block 408, if a determination is made that this address-predictable branch instruction is not either an unconditional branch or a conditional branch predicted to be taken, the process passes to block 409. Block 409 depicts fetching the next instruction from the sequential address. The process then passes to block 412.

Referring again to block 410, block 410 illustrates reading the entry of the cache determined in block 407 to determine the predicted destination of this address-predictable branch instruction. Next, block 411 depicts fetching an instruction from the predicted destination. Block 412, then, depicts reading the confirmation bit associated with this entry of the cache. The process then is, passes to block 414 which illustrates executing this address-predictable branch instruction, and determining the actual destination of the executed address-predictable branch instruction.

Next, block 416 illustrates a determination of whether or not this address-predictable instruction is an unconditional branch instruction or a conditional branch instruction which was taken. If a determination is made that the address-predictable instruction is not either an unconditional branch instruction or a conditional branch instruction which was taken, the process passes back to block 402. Referring again to block 416,. if a determination is made that the address-predictable instruction is either an unconditional branch instruction or a conditional branch instruction which was taken, the process passes to block 418.

Block 418 depicts a determination of whether or not the address-predictable branch instruction branched to the predicted destination, i.e. whether the predicted destination is equal to the actual destination. If a determination is made that the address-predictable branch instruction branched to the predicted destination, the process passes to block 420 which illustrates a determination of whether or not the confirmation bit associated with the entry of the cache for this address-predictable branch instruction is equal to a "1". If a determination is made that the confirmation bit associated with the entry of the cache for this address-predictable branch instruction is equal to a "1", the process passes to block 402. Referring again to block 420, if a determination is made that the confirmation bit associated with the entry of the cache for this address-predictable branch instruction is not equal to a "1", i.e. it is equal to a "0", the process passes to block 421 which depicts setting the confirmation bit associated with the entry for this address-predictable branch instruction equal to a "1". The process then passes to block 402.

Referring again to block 418, if a determination is made that the address-predictable branch instruction did not branch to the predicted destination, the process passes to block 422 which illustrates flushing all fetched instructions after this branch instruction. Next, block 424 depicts fetching instructions from the correct address. Thereafter, block 426 illustrates a determination of whether or not the confirmation bit associated with the entry of the cache for this address-predictable branch instruction is equal to a "1". If a determination is made that the confirmation bit associated with the entry of the cache for this address-predictable branch instruction is equal to a "1", the process passes to block 428 which depicts setting the confirmation bit for this entry of the cache to be equal to a "0". The process then passes to block 402.

Referring again to block 426, if a determination is made that the confirmation bit associated with the entry of the cache for this address-predictable branch instruction is not equal to a "1", i.e. it is equal to a "0", the process passes to block 430 which depicts writing the actual destination to which the address-predictable branch instruction branched into the entry of the cache associated with this address-predictable branch instruction. Thereafter, block 432 illustrates setting the confirmation bit for this entry of the cache equal to a "1". The process then passes to block 402.

While a preferred embodiment has been particularly shown and described, it will be understood by those skilled in the art that various changes in form and detail may be made therein without departing from the spirit and scope of the present invention.

What is claimed is:

1. A branch prediction method in a processor, said method comprising the steps of:

storing a predicted branch destination for a branch instruction;

determining, in response to a first instance of executing a first branch instruction, whether the stored destination was a misprediction;

maintaining said stored destination regardless of whether the predicted. branch destination was a misprediction in the first instance:of executing the branch instruction;

determining, in response to a second instance of executing the branch instruction, whether the stored destination was a misprediction; and changing said stored destination in response to the stored destination being a misprediction for both the first and second instances of executing the branch instruction.

2. The method of claim 1, wherein the changing is further in response to the first and second instances of executing the first branch instruction being consecutive instances.

3. The method according to claim 2, further comprising the step of storing said predicted branch destination in one of a plurality of entries in a cache, said one of said plurality of entries being associated with said branch instruction.

4. The method according to claim 3, further comprising the step of associating each of said plurality of entries of said cache with a different one of a plurality of confirmation bits, said plurality of confirmation bits being utilized to determine consecutive mispredictions.

5. The method according to claim 4, further comprising the step of prior to executing said branch instruction, reading said one of said plurality of entries associated with said branch instruction.

6. The method according to claim 5, further comprising the steps of:

determining whether said one of said plurality of confirmation bits is set equal to a one in response to said stored destination being a misprediction; and resetting said one of said confirmation bits equal to a zero in response to a determination that said one of said plurality of confirmation bits is set equal to a one.

7. The method according to claim 6, further comprising the steps of:

updating said one of said plurality of entries of said cache by storing an actual destination in said one of said plurality of entries in response to a determination that said one of said plurality of confirmation bits is set equal to a zero; and setting said one of said confirmation bits equal to a one.

8. The method according to claim 7, further comprising the steps of:

determining whether said one of said plurality of confirmation bits is set equal to a zero in response to a said stored destination being a correct prediction; and setting said one of said confirmation bits equal to a one in response to a determination that said one of said plurality of confirmation bits is set equal to a zero.

9. A branch prediction method in a processor, said method comprising the steps of:

aliasing a set of branch instructions, wherein the set includes at least first and second branch instructions;

predicting a branch destination for one of the set of branch instructions and storing the predicted branch destination as the single prediction for the set;

determining, in response to instances of executing instructions from the set of branch instructions, whether the stored destination was a misprediction in the respective instances;

changing said stored destination in response to mispredictions being consecutive with respect to the instructions from the set; and maintaining said stored destination unchanged in an instance that is the first instance, since changing the stored destination, of executing one of the instructions from the set.

10. The method of claim 9, wherein the step of maintaining said stored destination unchanged is irrespective of whether execution of other branch instructions, besides those of the aliased set, intervene among those consecutive instances of executing instructions from the set.

11. The method of claim 10, wherein the step of maintaining said stored destination unchanged in an instance that is the first instance, since changing the stored destination, of executing one of the instructions from the set, includes maintaining said stored destination unchanged responsive to an instance that is a certain instance after the first instance, so that the step of changing said stored destination in response to a misprediction being consecutive with respect to the instructions from the set, includes changing responsive to said mispredictions being more than two in consecutive sequence with respect to the instructions from the set.

12. The method according to claim 11, further comprising the step of storing said predicted branch destination in one of a plurality of entries in a cache, said one of said plurality of entries being associated with said branch instruction.

13. The method according to claim 12, further comprising the step of associating each of said plurality of entries of said cache with a different one of a plurality of confirmation bits, said plurality of confirmation bits being utilized to determine consecutive mispredictions.

14. The method according to claim 13, further comprising the step of prior to executing said one of the instructions from the set, reading said one of said plurality of entries associated with said one of the instructions.

15. The method according to claim 14, further comprising the steps of:

determining whether said one of said plurality of confirmation bits is set equal to a one in response to said stored destination being a misprediction; and resetting said one of said confirmation bits equal to a zero in response to a determination that said one of said plurality of confirmation bits is set equal to a one.

16. The method according to claim 15, further comprising the steps of:

updating said one of said plurality of entries of said cache by storing an actual destination in said one of said plurality of entries in response to a determination that said one of said plurality of confirmation bits is set equal to a zero; and setting said one of said confirmation bits equal to a one.

17. The method according to claim 16, further comprising the steps of:

determining whether said one of said plurality of confirmation bits is set equal to a zero in response to a said stored destination being a correct prediction; and setting said one of said confirmation bits equal to a one in response to a determination that said one of said plurality of confirmation bits is set equal to a zero.

18. A method in a processor for improving the accuracy of a prediction of a destination of one of a plurality of branch instructions utilizing a cache included within said processor, said cache including a plurality of entries, each of said plurality of branch instructions associated with one of said plurality of entries of said cache, said method comprising the steps of:

storing a predicted branch destination for one of said plurality of branch instructions in one of said plurality of entries of said cache associated with said one of said plurality of branch instructions; and updating said predicted branch destination stored in said one of said plurality of entries of said cache in response to two consecutive mispredictions of a destination of said one of said plurality of branch instructions, wherein said two consecutive mispredictions were made utilizing said one of said plurality of entries of said cache.

19. The method according to claim 18, further comprising the step of associating each of said plurality of entries of said cache with a different one of a plurality of confirmation bits, said plurality of confirmation bits being utilized to determine consecutive mispredictions.

20. The method according to claim 19, further comprising the step of executing said one of said plurality of branch instructions, said one of said plurality of branch instructions branching to an actual destination during said execution.

21. The method according to claim 20, further comprising the steps of:

comparing said actual destination to said predicted branch destination;

determining whether an earlier prediction made prior to said predicted branch destination was incorrect in response to said actual destination being different from said predicted branch destination; and updating said predicted branch destination stored in said one of said plurality of entries by storing said actual destination in said one of said plurality of entries in response to said earlier prediction being incorrect.

22. The method according to claim 21, further comprising the step of prior to said step of executing said one of said plurality of branch instructions, reading said one of said plurality of entries associated with said one of said plurality of branch instructions.

23. The method according to claim 22, further comprising the steps of:

reading said one of said plurality of confirmation bits associated with said one of said plurality of entries;

determining whether said one of said plurality of confirmation bits is set equal to a one in response to said actual destination being different from said predicted branch destination; and resetting said one of said confirmation bits equal to a zero in response to a determination that said one of said plurality of confirmation bits is set equal to a one.

24. The method according to claim 23, further comprising the steps of:

updating said one of said plurality of entries of said cache by storing said actual destination in said one of said plurality of entries in response to a determination that said one of said plurality of confirmation bits is set equal to a zero; and setting said one of said confirmation bits equal to a one.

25. The method according to claim 24, further comprising the steps of:

determining whether said one of said plurality of confirmation bits is set equal to a zero in response to said actual destination being equal to said predicted branch destination; and setting said one of said confirmation bits equal to a one in response to a determination that said one of said plurality of confirmation bits is set equal to a zero.

26. The method according to claim 25, wherein the step of associating each of said plurality of entries of said cache with a different one of a plurality of confirmation bits, each of said plurality of confirmation bits including a single bit.

27. The method according to claim 26, wherein the step of associating each of said plurality of entries of said cache with a different one of a plurality of confirmation bits, each of said plurality of confirmation bits including a two bits.

28. A processor for improving the accuracy of a branch instruction predictions, comprising:

means for storing a predicted branch destination for a branch instruction;

means for determining, in response to a first instance of executing a first branch instruction, whether the stored destination was a misprediction;

means for maintaining said stored destination regardless of whether the predicted branch destination was a misprediction in the first instance of executing the branch instruction;

means for determining, in response to a second instance of executing the branch instruction, whether the stored destination was a misprediction; and means for changing said stored destination in response to the stored destination being a misprediction for both the first and second instances of executing the branch instruction.

29. The processor of claim 28, wherein said means for changing further includes means for changing in response to the first and second instances of executing the first branch instruction being consecutive instances.

30. The processor of claim 29, further comprising means for storing said predicted:branch destination in one of a plurality of entries in a cache, said one of said plurality of entries being associated with said branch instruction.

31. The processor according to claim 30, further comprising means for associating each of said plurality of entries of said cache with a different one of a plurality of confirmation bits, said plurality of confirmation bits being utilized to determine consecutive mispredictions.

32. The processor according to claim 31, further comprising means for prior to executing said branch instruction, reading said one of said plurality of entries associated with said branch instruction.

33. The processor according to claim 32, further comprising:

means for determining whether said one of said plurality of confirmation bits is set equal to a one in response to said stored destination being a misprediction; and means for resetting said one of said confirmation bits equal to a zero in response to a determination that said one of said plurality of confirmation bits is set equal to a one.

34. The processor according to claim 33, further comprising:

means for updating said one of said plurality of entries of said cache by storing an actual destination in said one of said plurality of entries in response to a determination that said one of said plurality of confirmation bits is set equal to a zero; and means for setting said one of said confirmation bits equal to a one.

35. The processor according to claim 34, further comprising:

means for determining whether said one of said plurality of confirmation bits is set equal to a zero in response to a said stored destination being a correct prediction; and means for setting said one of said confirmation bits equal to a one in response to a determination that said one of said plurality of confirmation bits is set equal to a zero.

36. A processor for improving branch predictions, comprising:

means for aliasing a set of branch:instructions, wherein the set includes at least first and second branch instructions;

means for predicting a branch destination for one of the set of branch instructions and storing the predicted branch destination as the single prediction for the set;

means for determining, in response to instances of executing instructions from the set of branch instructions, whether the stored destination was a misprediction in the respective instances;

means for changing said stored destination in response to mispredictions being consecutive with respect to the instructions from the set; and means for maintaining said stored destination unchanged in an instance that is the first instance, since changing the stored destination, of executing one of the instructions from the set.

37. The processor of claim 36, wherein said means for maintaining said stored destination unchanged is irrespective of whether execution of other branch instructions, besides those of the aliased set, intervene among those consecutive instances of executing instructions from the set.

38. The processor of claim 37, wherein said means for maintaining said stored destination unchanged in an instance that is the first instance, since changing the stored destination, of executing one of the instructions from the set, includes maintaining said stored destination unchanged responsive to an instance that is a certain instance after the first instance, so that said means for changing said stored destination in response to a misprediction being consecutive with respect to the instructions from the set, includes changing responsive to said mispredictions being more than two in consecutive sequence with respect to the instructions from the set.

39. The processor according to claim 38, further comprising means for storing said predicted branch destination in one of a plurality of entries in a cache, said one of said plurality of entries being associated with said branch instruction.

40. The processor according to claim 39, further comprising means for associating each of said plurality of entries of said cache with a different one of a plurality of confirmation bits, said plurality of confirmation bits being utilized to determine consecutive mispredictions.

41. The processor according to claim 40, further comprising means for prior to executing said one of the instructions from the set, reading said one of said plurality of entries associated with said one of the instructions.

42. The processor according to claim 41, further comprising:
   means for determining whether said one of said plurality of confirmation bits is set equal to a one in response to said stored destination being a misprediction; and
   means for resetting said one of said confirmation bits equal to a zero in response to a determination that said one of said plurality of confirmation bits is set equal to a one.

43. The processor according to claim 42, further comprising:
   means for updating said one of said plurality of entries of said cache by storing an actual destination in said one of said plurality of entries in response to a determination that said one of said plurality of confirmation bits is set equal to a zero; and
   means for setting said one of said confirmation bits equal to a one.

44. The processor according to claim 43, further comprising:
   means for determining whether said one of said plurality of confirmation bits is set equal to a zero in response to a said stored destination being a correct prediction; and
   means for setting said one of said confirmation bits equal to a one in response to a determination that said one of said plurality of confirmation bits is set equal to a zero.

45. A processor for improving the accuracy of a prediction of a destination of one of a plurality of branch instructions utilizing a cache included within said processor, comprising:
   said cache including a plurality of entries, each of said plurality of branch instructions associated with one of said plurality of entries of said cache;
   means for storing a predicted branch destination for one of said plurality of branch instructions in one of said plurality of entries of said cache associated with said one of said plurality of branch instructions; and
   means for updating said predicted branch destination stored in said one of said plurality of entries of said cache in response to two consecutive mispredictions of a destination of said one of said plurality of branch instructions, wherein said two consecutive mispredictions were made utilizing said one of said plurality of entries of said cache.

46. The processor according to claim 45, further comprising means for associating each of said plurality of entries of said cache with a different one of a plurality of confirmation bits, said plurality of confirmation bits being utilized to determine consecutive mispredictions.

47. The processor according to claim 46, further comprising means for executing said one of said plurality of branch instructions, said one of said plurality of branch instructions branching to an actual destination during said execution.

48. The processor according to claim 47, further comprising:
   means for comparing said actual destination to said predicted branch destination;
   means for determining whether an earlier prediction made prior to said predicted branch destination was incorrect in response to said actual destination being different from said predicted branch destination; and
   means for updating said predicted branch destination stored in said one of :said plurality of entries by storing said actual destination in said one of said plurality of entries in response to said earlier prediction being incorrect.

49. The processor according to claim 48, further comprising prior to said means for executing said one of said-plurality of branch instructions, means for reading said one of said plurality of entries associated with said one of said plurality of branch instructions.

50. The processor according to claim 49, further comprising:
   means for reading said one of said plurality of confirmation bits associated with said one of said plurality of entries;
   means for determining whether said one of said plurality of confirmation bits is set equal to a one in response to said actual destination being different from said predicted branch destination; and
   means for resetting said one of said confirmation bits equal to a zero in response to a determination that said one of said plurality of confirmation bits is set equal to a one.

51. The processor according to claim 50, further comprising:
   means for updating said one of said plurality of entries of said cache by storing said actual destination in said one of said plurality of entries in response to a determination that said one of said plurality of confirmation bits is set equal to a zero; and
   means for setting said one of said confirmation bits equal to a one.

52. The processor according to claim 51, further comprising:
   means for determining whether said one of said plurality of confirmation bits is set equal to a zero in response to said actual destination being equal to said predicted branch destination; and
   means for setting said one of said confirmation bits equal to a one in response to a determination that said one of said plurality of confirmation bits is set equal to a zero.

53. The processor according to claim 52, wherein said means for associating each of said plurality of entries of said cache with a different one of a plurality of confirmation bits further comprises means for each of said plurality of entries of said cache with a different one of a plurality of confirmation bits, each of said plurality of confirmation bits including a single bit.

54. The processor according to claim 53, wherein said means for associating each of said plurality of entries of said cache with a different one of a plurality of confirmation bits further comprises means for associating each of said plurality of entries of said cache with a different one of a plurality of confirmation bits, each of said plurality of confirmation bits including a two bits.

* * * * *